United States Patent
Lineton et al.

(10) Patent No.: US 10,731,598 B2
(45) Date of Patent: Aug. 4, 2020

(54) PISTON HAVING AN UNDERCROWN SURFACE WITH COATING AND METHOD OF MANUFACTURE THEREOF

(71) Applicant: Tenneco Inc., Lake Forest, IL (US)

(72) Inventors: Warran Boyd Lineton, Chelsea, MI (US); Miguel Azevedo, Trion, GA (US); Thomas Egerer, Ann Arbor, MI (US); Gregory Salenbien, Britton, MI (US); Neil Ainsworth, Ann Arbor, MI (US)

(73) Assignee: Tenneco Inc., Lake Forest, IL (US)

( * ) Notice: Subject to any disclaimer, the term of this patent is extended or adjusted under 35 U.S.C. 154(b) by 0 days.

(21) Appl. No.: 16/164,710

(22) Filed: Oct. 18, 2018

(65) Prior Publication Data

US 2020/0123998 A1    Apr. 23, 2020

(51) Int. Cl.
*F02F 3/10*    (2006.01)
*F01P 3/10*    (2006.01)
(Continued)

(52) U.S. Cl.
CPC ............. *F02F 3/10* (2013.01); *C23C 4/134* (2016.01); *C25D 5/02* (2013.01); *C25D 7/00* (2013.01);
(Continued)

(58) Field of Classification Search
CPC ...... F02F 3/10; F02F 3/003; F02F 3/18; F02F 3/22; F02F 3/0084; F02F 2003/0061; F01P 3/10; C25D 5/02; C25D 7/00; C23C 4/134
See application file for complete search history.

(56) References Cited

U.S. PATENT DOCUMENTS 4,368,697 A * 1/1983 Moebus ................ F02F 3/0076
                                                   123/193.6
4,528,108 A    7/1985 Grover
(Continued)

FOREIGN PATENT DOCUMENTS

DE    102012211440 A1    9/2009
DE    102012216925 A1    3/2014
(Continued)

OTHER PUBLICATIONS

International Search Report, dated Jan. 27, 2020 (PCT/US2019/056991).

*Primary Examiner* — Jacob M Amick
*Assistant Examiner* — Charles Brauch
(74) *Attorney, Agent, or Firm* — Robert L. Stearns; Dickinson Wright, PLLC (57) ABSTRACT

A vehicle internal combustion piston and method of construction thereof are provided. The piston includes piston body extending along a central longitudinal axis, having an upper combustion wall forming an upper combustion surface and an undercrown surface opposite the upper combustion surface. An annular ring belt region depends from the upper combustion surface, a pair of skirt panels depend from the ring belt region, and a pair of pin bosses depend from the undercrown surface to provide laterally spaced pin bores aligned along a pin bore axis for receipt of a wrist pin. The undercrown surface forms a central undercrown region, and a portion of either an open outer cooling gallery, a sealed outer cooling gallery, or an outer galleryless region. A coating including copper is applied to hot spots along the undercrown surface to mitigate the hot spots provide a more uniform temperature along the undercrown surface during operation.

8 Claims, 4 Drawing Sheets

(51) Int. Cl.
  *F02F 3/22* (2006.01)
  *F02F 3/00* (2006.01)
  *F02F 3/18* (2006.01)
  *C25D 5/02* (2006.01)
  *C25D 7/00* (2006.01)
  *C23C 4/134* (2016.01)

(52) U.S. Cl.
  CPC .............. *F01P 3/10* (2013.01); *F02F 3/003* (2013.01); *F02F 3/0084* (2013.01); *F02F 3/18* (2013.01); *F02F 3/22* (2013.01); *F02F 2003/0061* (2013.01)

(56) References Cited

U.S. PATENT DOCUMENTS

| | | |
|---|---|---|
| 8,662,026 B2 | 3/2014 | Azevedo et al. |
| 8,863,647 B2 | 10/2014 | Kopchick |
| 8,955,486 B2 | 2/2015 | Azevedo et al. |
| 9,127,618 B2 | 9/2015 | Azevedo et al. |
| 9,127,619 B2 | 9/2015 | Lineton et al. |
| 2004/0194308 A1* | 10/2004 | Bing ................ B21K 1/18 29/888.044 |
| 2013/0206095 A1 | 8/2013 | Azevedo et al. |
| 2014/0083390 A1 | 3/2014 | Azevedo et al. |
| 2014/0123930 A1* | 5/2014 | Lineton ............ F02F 3/16 123/193.6 |
| 2014/0238360 A1* | 8/2014 | Dion ................ F16J 1/09 123/51 B |
| 2014/0251255 A1 | 9/2014 | Beerens et al. |
| 2016/0123274 A1 | 5/2016 | Miller et al. |
| 2017/0335792 A1* | 11/2017 | Matsuo ............ C23C 30/00 |

FOREIGN PATENT DOCUMENTS

| | | | |
|---|---|---|---|
| EP | 2096290 A1 | 9/2009 | |
| GB | 263055 A | 12/1926 | |
| GB | 309537 A | 4/1930 | |
| JP | S5250108 U | 4/1977 | |
| JP | S6336646 U | 3/1988 | |
| JP | H10184450 A | 7/1998 | |
| KR | 20170069373 A | * 6/2017 | ........... C09D 127/18 |

\* cited by examiner

PISTON HAVING AN UNDERCROWN SURFACE WITH COATING AND METHOD OF MANUFACTURE THEREOF

BACKGROUND OF THE INVENTION

1. Field of the Invention

This invention relates generally to pistons for internal combustion engines, and methods for manufacturing the pistons.

2. Related Art

Pistons used in internal combustion engines, such as heavy duty diesel pistons, are exposed to extremely high temperatures during operation, especially along the crown of the piston. Engine and piston manufacturers typically attempt to control the temperature of the crown and reduce heat loss from the combustion chamber to the crown, in order to maintain usable fuel energy and high gas temperature inside the combustion chamber, and to achieve a higher engine brake thermal efficiency (BTE).

To moderate the temperature of the crown, some pistons are designed with a cooling gallery beneath the crown, wherein cooling oil is sprayed into the cooling gallery and onto an undercrown surface as the piston reciprocates along a cylinder bore of the engine. The oil flows along the inner surface of the cooling gallery and dissipates heat from the crown. However, to control the piston temperature during operation, a high flow of oil must be constantly maintained, which adds to the parasitic losses, which in turn reduces the engine fuel efficiency. In addition, the oil degrades over time due to the high temperature of the internal combustion engine, and thus, the oil must be changed periodically to maintain adequate engine life.

Another way to control the temperature of the crown is to design the piston with a sealed cooling gallery containing coolant media which are more heat resistant than oil when exposed to high temperatures. U.S. Pat. No. 9,127,619 discloses an example of a piston including a sealed cooling gallery partially filled with a liquid containing metal particles having a high thermal conductivity. The liquid carries the metal particles throughout the cooling gallery as the piston reciprocates in the internal combustion engine, and the metal particles remove heat from the crown. The metal particles can re-distribute the heat flow, and thus also reduces cooling gallery deposits, and oil degradation.

During operation of steel diesel engine pistons, hot spots are oftentimes present along the cooling gallery and undercrown regions. Such hot spots are a consequence of the piston geometry, localized oil cooling, and a non-uniform temperature map in the combustion bowl and at the crown surface. In some piston designs, the hot spots are clearly apparent and correlate with the spray patterns from fuel injectors. The thermal conductivity of 4140 steel and microalloy steel is typically in the range 30 to 45 W/m·K, and this is in the range that hot spots can form and remain. Hot spots are clearly seen in some regions of the piston in both FEA models and direct measurements using templugs and/or thermally responsive paint. The hot spots may be more prevalent in a steel with lower thermal conductivity such as 42CrMo4+Si (25 to 30 W/m·K). Evening out the hot spots would reduce oil degradation and subsequent carbon deposition formation. Engine and piston manufacturers continuously strive to develop new and improved ways to reduce and control the temperatures of pistons.

SUMMARY

One aspect of the invention provides a piston for an internal combustion engine, such as a diesel engine, capable of operating at reduced or more controlled temperatures. The piston comprises a piston body extending along a central longitudinal axis. The piston body has an upper combustion wall forming an upper combustion surface and an undercrown surface opposite the upper combustion surface. The piston body also includes a ring belt region depending from the upper combustion surface, a pair of skirt panels depending from the ring belt region, and a pair of pin bosses depending from the undercrown surface, wherein the pin bosses provide a pair of laterally spaced pin bores. The piston body includes one of an open outer cooling gallery forming a portion of the undercrown surface, a sealed outer cooling gallery forming a portion of the undercrown surface, and an outer galleryless region forming a portion of the undercrown surface. The piston body also includes a central undercrown region forming a portion of the undercrown surface. A coating having a thermal conductivity ranging from 45 to 429 W/m·K is applied to at least one hotter area of at least one of the portions of the undercrown surface, but not applied to at least one cooler area of at least one of the portions of the undercrown surface. During operation of the piston, the at least one hotter area is at a higher temperature than the at least one cooler area when the coating is not applied.

Another aspect of the invention provides a method of manufacturing the piston for an internal combustion engine. The method comprises the steps of providing the piston body, applying the coating including copper to at least one hotter area of at least one of the portions of the undercrown surface and not applying the coating to at least one area of at least one of the cooler portions of the undercrown surface.

BRIEF DESCRIPTION OF THE DRAWINGS

These and other aspects, features and advantages of the invention will become more readily appreciated when considered in connection with the following detailed description, appended claims and accompanying drawings, in which:

DETAILED DESCRIPTION OF EXEMPLARY EMBODIMENTS

Figure 1:
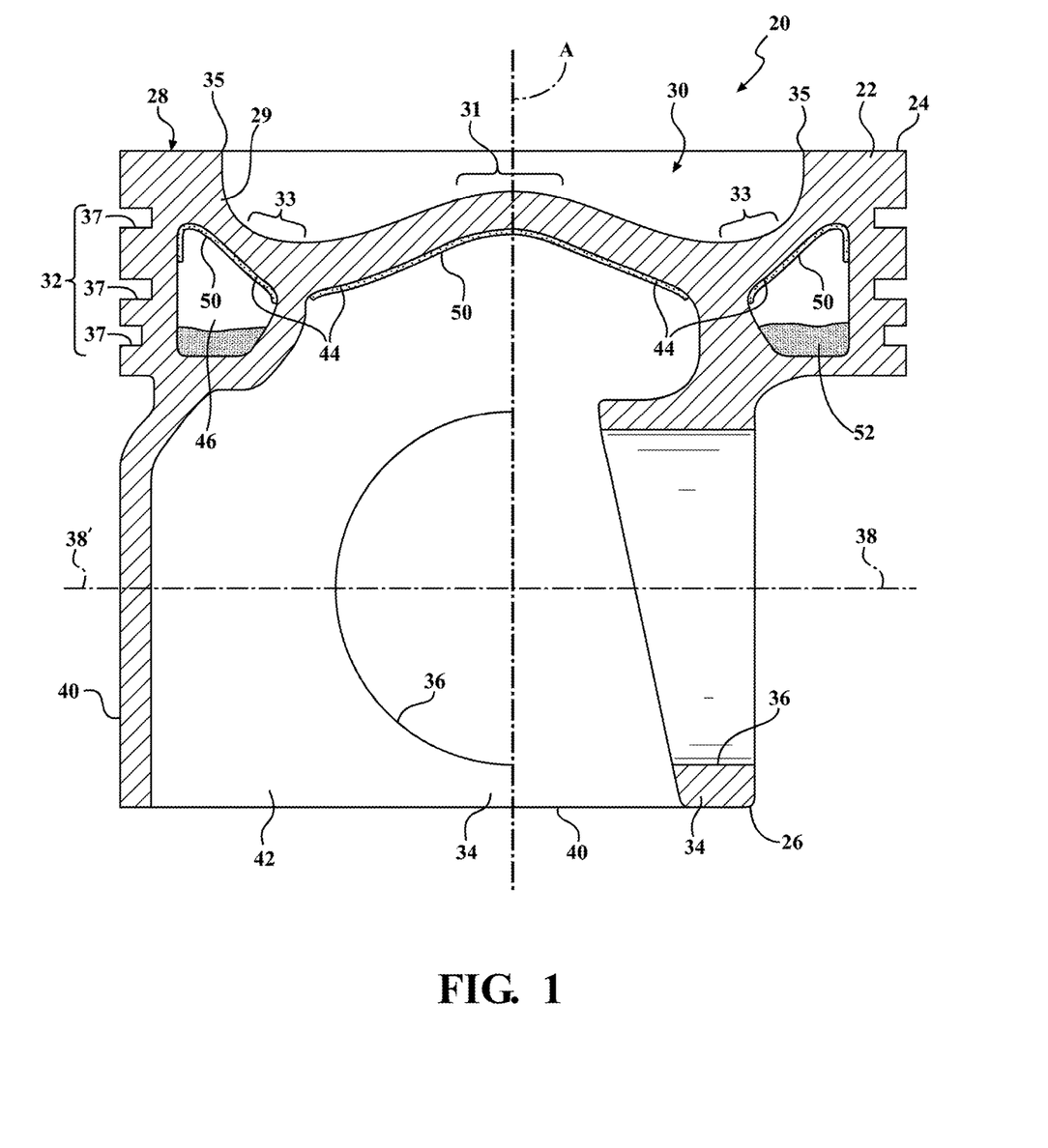
FIG. 1 is a dual cross-sectional side view of a piston constructed in accordance with one aspect of the invention shown taken generally transversely to a pin bore axis to the left of axis A, and shown taken generally along the pin bore axis to the right of axis A.
Figure 1A:
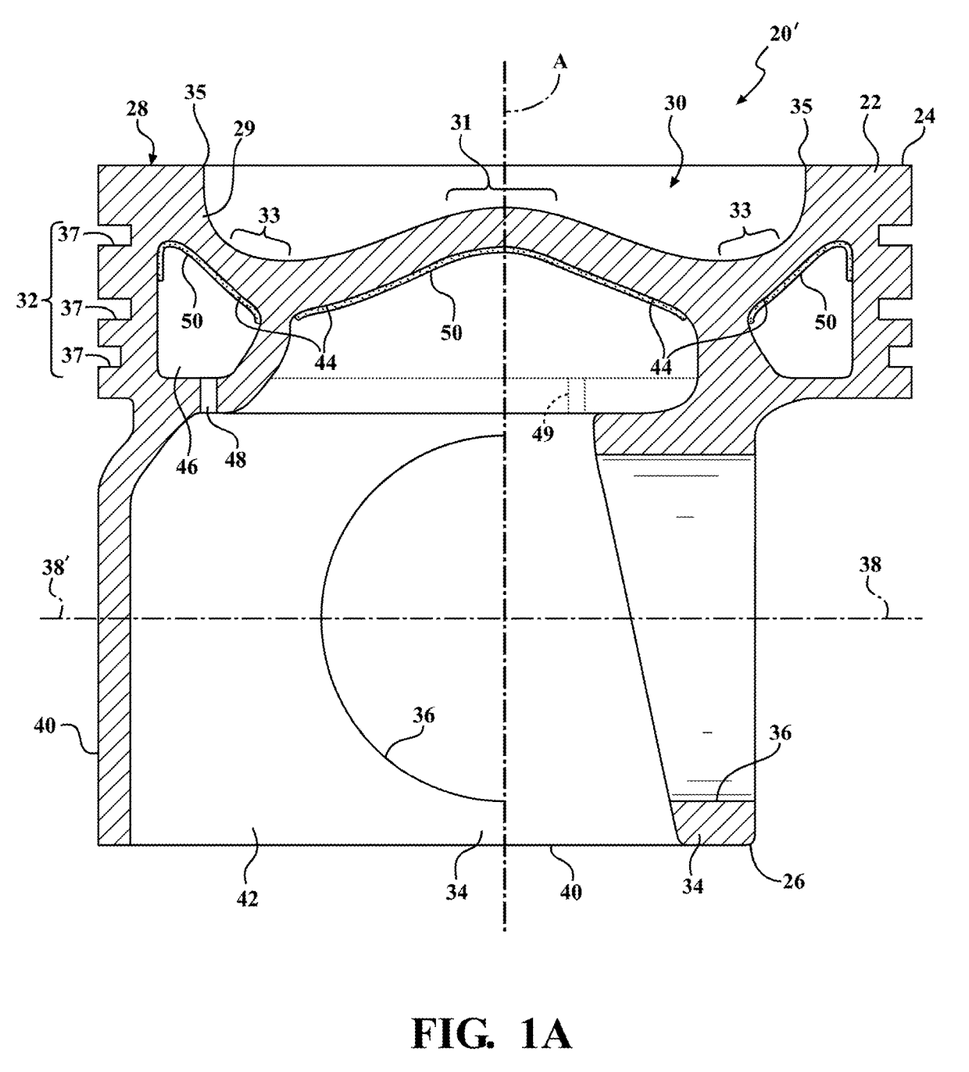
FIG. 1A is a view similar to FIG. 1 of a piston constructed in accordance with another aspect of the invention.
Figure 2:
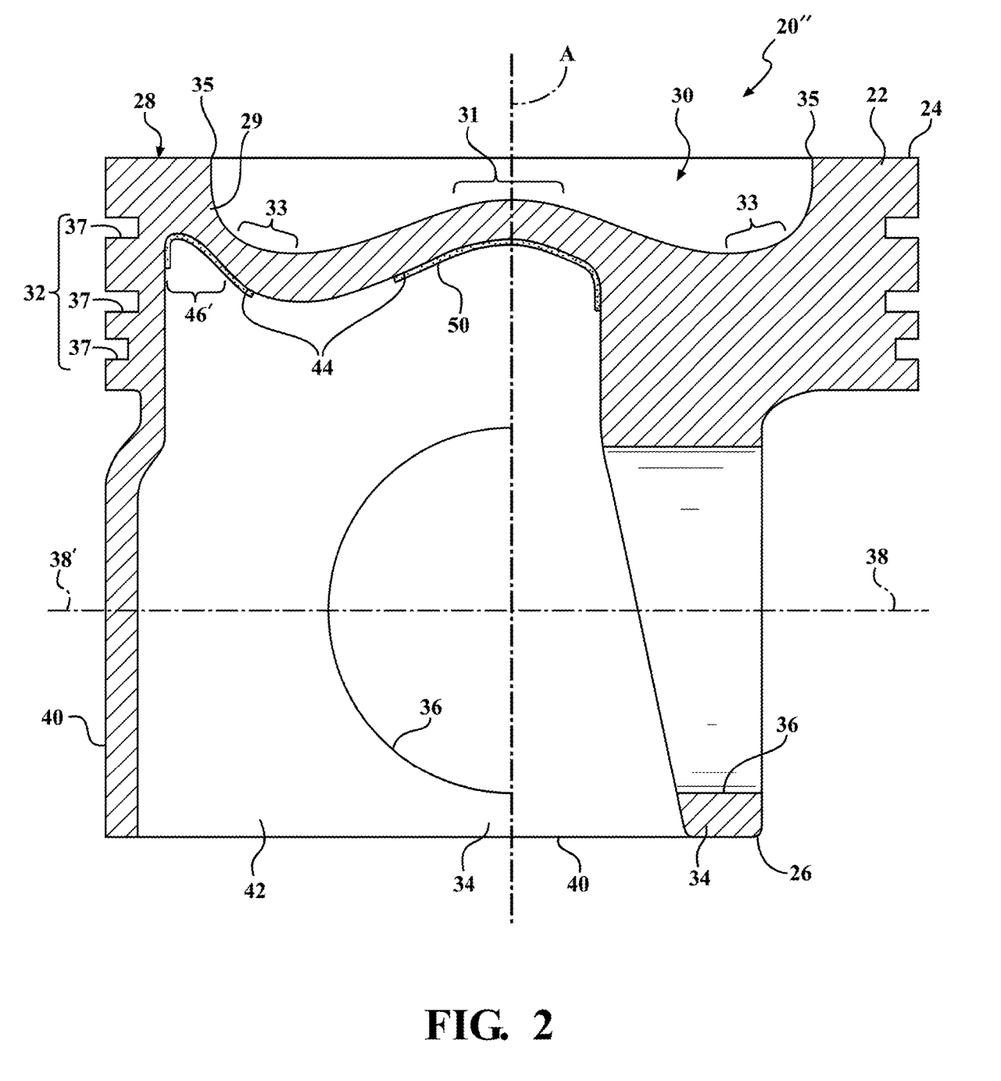
FIG. 2 is a view similar to FIG. 1 of a piston constructed in accordance with another aspect of the invention.
Figure 3:
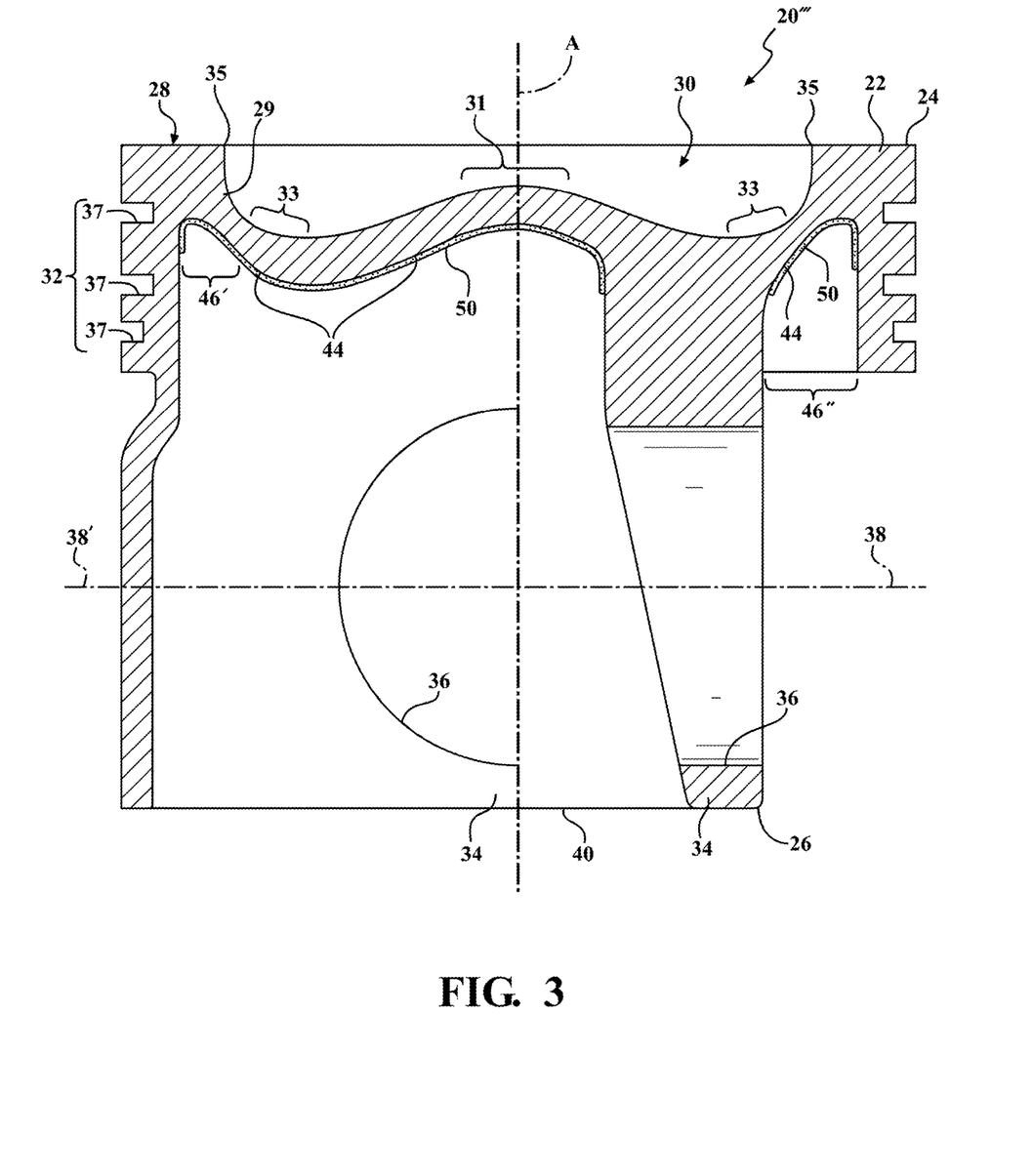
FIG. 3 is a view similar to FIG. 1 of a piston constructed in accordance with yet another aspect of the invention.

Referring in more detail the drawings, FIGS. 1-3 illustrate respective pistons 20, 20', 20", 20''' for an internal combustion engine according to different example embodiments of the invention. The pistons 20, 20', 20", 20''' are discussed hereafter using the same reference numerals to identify like features. The pistons 20, 20', 20", 20''' each have a body 22 formed of a metal material, such as steel, cast iron, or another ferrous material. According to preferred embodiments, the steel is 4140 steel or microalloy steel, and/or the steel has a thermal conductivity in the range of 25 to 45 W/m·K.

The body 22 extends along a center axis A, along which the pistons 20, 20', 20", 20'" reciprocate in use, from an upper end 24 to a lower end 26. The body 22 of the pistons 20, 20', 20", 20'" include a crown 28 at the upper end 24 of an upper combustion wall 29, wherein the crown 28 is directly exposed to a combustion chamber and hot gases therein during use, with a combustion bowl 30 depending therein.

In the example embodiments, the combustion bowl 30 of the body 22 presents an apex region 31 about the center axis A, a concave, toroidal bowl-shaped valley region 33 surrounding the center axis A, and a bowl-rim 35 surrounding the valley 33. An annular ring belt 32 depends from the crown 28 to present a plurality of ring grooves 37 facing away from the center axis A and extending circumferentially around the center axis A.

The pistons 20, 20', 20", 20'" further include a lower part presenting a pair of pin bosses 34, each depending from the crown 28, having pin bores 36 aligned with one another along a pin bore axis 38 extending perpendicular to the center axis A for receiving a wrist pin (not shown). The body 22 also includes a pair of diametrically opposite skirt panels 40 depending from the crown 28 and extending along a circumferential direction partially about the center axis A along opposite sides of the pin bore axis 38. The skirt panels 40 are joined to the pin bosses 34 via strut portions 42. It is noted that the body 22 of the pistons 20, 20', 20", 20'" could comprise various other designs and features than those shown in FIGS. 1-3.

The lower part of the body 22 of the piston 20 also presents an undercrown surface 44 on an opposite side of the upper combustion wall 29 from the crown 28, and facing opposite the combustion bowl 30. The piston 20 can optionally include an outer cooling gallery 46 in addition to the undercrown surface 44, as shown in FIGS. 1 and 1A. In these embodiments, the outer cooling gallery 46 is disposed adjacent the ring belt 32 in radial alignment or substantial radial alignment therewith (substantial is intended to mean that at least a portion of the outer cooling gallery 46 is radially aligned with the ring belt 32, but a portion may not be radially aligned with the ring belt 32), wherein the cooling gallery 46 extends circumferentially around the center axis A. As shown in FIG. 1, the outer cooling gallery 46 can be sealed to contain a cooling media therein, which can be a solid, liquid, and/or gas. According to one embodiment, the sealed outer cooling gallery 46 can be filled with air. Otherwise, as shown in FIG. 1A, the outer cooling gallery 46 can be open, thereby including inlet and outlet openings 48, 49, such that cooling oil from a crankcase can enter and exit the outer cooling gallery 46, such as by being sprayed into the inlet opening 48 and allowed to exit the outlet opening 49. If desired, the inlet and outlet openings 48, 49 can be sealed, for example a plug, adhesive, weld, or braze, with the desired cooling medium or composition 52 disposed therein, to form the sealed cooling gallery of FIG. 1.

In the examples of FIGS. 1 and 1A, the piston 20, 20' includes a central region of the undercrown surface 44 located along the center axis A and surrounded by the sealed or open outer cooling gallery 46. The central region of the undercrown surface 44 is open and shown located directly opposite the apex region 31 of the combustion bowl 30 so that cooling oil from the crankcase can be sprayed or splashed onto the central region of the undercrown surface 44. However, the central region of the undercrown surface 44 could alternatively be closed or sealed off from direct exposure to the crankshaft region. A further portion of the undercrown surface 44 is formed by the uppermost surfaces of the open or sealed outer cooling gallery 46 opposite the valley region 33. It is noted that the center region of the undercrown surface 44 does not need to be open as shown in FIGS. 1 and 1A.

In the example embodiment of FIG. 2, the piston 20" does not include a closed or sealed outer cooling gallery, but instead includes an open outer galleryless region 46' and the central region of the undercrown surface 44, which are both openly exposed along the lower part of the piston 20". The open galleryless region 46' is shown as extending only along a pair of diametrically opposite regions of the piston 20", wherein one of the regions extends along one side of the pin bore axis 38 generally parallel thereto and generally transversely to a thrust axis axis 38', and the other of the other of the regions extends along another side of the pin bore axis 38 generally parallel thereto and generally transversely to the thrust axis 38'. Accordingly, the open galleryless region 46' is formed to extend along opposite sides of the pin bore axis 38, radially inwardly from the skirt panels 40 and in radial alignment with or substantial radial alignment with the ring belt 32. In the embodiment of FIG. 2, a further outer portion of the undercrown surface 44 is formed by the uppermost surfaces of the outer galleryless region 46', and portions of the pin bosses 34 located above the pin bores 36 and extending to the ring belt 32 are solid piston body material. The central region of the undercrown surface 44 and the outer portion of the undercrown surface 44 extends from the center axis A to the regions of the ring belt 32 located in axial alignment with the skirt panels 40.

In the embodiment of FIG. 3, the piston 20'" is similar to the piston 20"; however, rather than having an entirely solid piston body portion above and axially aligned with the pin bosses 34, extending to the ring belt 32, a pocket or second open outer galleryless region 46" is located radially outwardly of the pin bosses 34 adjacent and in radial alignment with the ring belt 32. As such, the second open outer galleryless region 46" allows the cooling of the entirety or substantial entirety of the ring belt region 32 to be enhanced via the combined circumferentially continuous configuration provided by the first and second galleryless regions 46', 46". In the embodiment of FIG. 3, the undercrown surface 44 is provided by the combination of the uppermost surfaces/portions of the open galleryless regions 46', 46" generally opposite the valley region 33 of the combustion bowl 30 and the central region of the undercrown surface 44 opposite the apex region 31 of the combustion bowl 30.

As shown in the Figures, a coating 50 having a high thermal conductivity is applied to at least a portion of the undercrown surface 44, and thus, to at least one of the undercrown portions provided by the open or sealed outer cooling gallery 46, and/or the outer galleryless regions 46', 46", and/or the open or sealed central region of the undercrown surface 44. The coating 50 is applied to hot spots which are present along the undercrown surface 44 during operation of the piston 20. Thus, the coating 50 is applied to at least one hotter area of at least one of the portions of said undercrown surface 44, and the coating 50 is not applied to at least one cooler area of at least one of the portions of said undercrown surface 44. The hot spots typically are at a temperature of at least 350° C. when the engine in which the piston 20 is used is running. Oftentimes, the coating 50 is applied in patches and thus to multiple hot spots along the undercrown surface 44. During operation of the piston 20, when the coating 50 is not applied to the piston body 22, the at least one hotter area is at a higher temperature than the at least one cooler area. Typically, each of the hotter areas are at a higher temperature than each of the cooler areas during operation of the piston 20 when the coating 50 is not applied. The coating 50 provides a more uniform temperature along the undercrown surface 44 of the piston body 22, and thus helps to avoid degradation of cooling oil which can be caused by the hot spots.

The coating 50 has a thermal conductivity ranging from 45 to 429 W/m·K. Preferably, the coating 50 includes copper and includes copper in an amount of at least 10 weight percent (wt. %), based on the total weight of the coating 50. The coating 50 also has a thickness ranging from 10 microns to 1 millimeter. If the coating 50 is applied by electroplating, the coating 50 typically has a porosity of less than 5%. If the coating 50 is applied by thermal spraying, the coating 50 typically has a porosity of 5% to 10%.

In the embodiments of FIGS. 2 and 3, the piston body 22 includes the outer galleryless region 46', 46" forming a portion of the undercrown surface 44, and the coating 50 is applied to the portion of the undercrown surface 44 formed by the outer galleryless region 46', 46". In this case, the coating 50 can be applied to less than all of the portion of the undercrown surface 44 formed by the outer galleryless region 46', 46".

According to another example embodiment, as shown in FIG. 1A, the piston body 22 includes the outer cooling gallery 64 forming a portion of the undercrown surface 44, the oil inlet opening 48 configured for oil to be sprayed in the cooling gallery 46, and the outlet opening 49 configured for the oil to exit the outer cooling gallery 46. In this case, the coating 50 is applied to the portion of the undercrown surface 44 formed by the outer cooling gallery 64.

According to yet another example embodiment, as shown in FIG. 1, the piston body 22 includes the sealed outer cooling gallery 64 forming a portion of the undercrown surface 44. In this case, the undercrown surface 44 surrounds the entire sealed outer cooling gallery 64, and the coating 50 is applied to the portion of the undercrown surface 44 formed by the closed outer cooling gallery 64. The coating 50 can be applied to the entire portion of the undercrown surface 44 forming the sealed cooling gallery 64, or only some of that portion of the undercrown surface 44, as shown in FIG. 1A.

In the embodiment wherein the piston body 22 includes the sealed outer cooling gallery 64, the coolant composition 52 including solid particles having a thermal conductivity ranging from 45 to 429 W/m·K, such as copper particles, silicone oil, and argon, is disposed in the sealed cooling gallery 64. During operation of the piston 20 when the engine is running, the solid particles present in the composition 52 deposit on the undercrown surface 44 of the sealed cooling gallery 64 by the forces inside the sealed cooling gallery 64 and thus form the coating 50. In this case, the coating 50 is formed from the solid particles of the composition 52, but some of the solid particles 52 remain in the composition 52. The solid particles forming the coating 50 typically have a particle size of 10 to 100 microns, and the solid particles remaining in the composition 52 have a particle size different from the solid particles forming the coating 50. In this embodiment, the coating 50 is preferably formed on the hotter areas, but may also be formed on at least one of the cooler areas of the undercrown surface 44. The cocktail shaker effect which occurs while the engine is running ensures that the composition 52, including the solid particles remaining in the composition 52, continue to transfer heat from the area of the sealed cooling gallery 64 to the underside of the piston body 22 where the heat is subsequently removed by an oil jet. In this case, the coating 50 is self-limiting and depends on a particle size distribution in which only a fraction of the solid particles are deposited. Hence, the hot spots are evened out by the deposited coating 50 and heat transfer continues with the three phase composition. Without the coating 50, the temperature of the hot spots could cause the silicone oil to degrade or solidify and thus not provide the desired cooling benefits needed to achieve a service life of 20,000 hours or more.

In the embodiments of FIGS. 1, 1A, 2, and 3, the coating 50 is also applied to the central region of the undercrown surface 44.

Another aspect of the invention provides a method of manufacturing the piston 20, 20', 20", 20''' including the coating 50. The body 22 of the piston 20, 20', 20", 20''', which is typically formed of steel, cast iron, or another ferrous material, can be manufactured according to various different methods, such as forging or casting. For example, the body 22 can include two pieces, a top and bottom, which are forged and then welded together. The body 22 of the piston 20, 20', 20", 20''' can also comprise various different designs, and examples of the designs are shown in FIGS. 1, 1A-3.

The method further includes applying the coating 50 to at least a portion of the undercrown surface 44, including at least a portion of the central region of the undercrown surface 44, and/or at least a portion of the outer cooling gallery 46, and/or at least a portion of the first and/or second open outer galleryless region 46', 46". The method also includes not applying the coating 50 to at least one of the areas of at least one of the portions of the undercrown surface 44, so that one or more areas of the undercrown surface 44 remains exposed or free of the coating 50. More specifically, the method includes applying the coating 50 having a thermal conductivity of 45 to 429 W/m·K to at least one hotter area of at least one of the portions of the undercrown surface 44 and not applying the coating 50 to at least one cooler area of at least one of the portions of the undercrown surface 44, wherein the at least one hotter area is at a higher temperature than the at least one cooler area during operation of the piston when the coating 50 is not applied.

Various difference techniques can be used to apply the coating 50. For example, the coating 50 can be applied by electroplating or thermal spraying, such as HVOF or plasma spraying. When the coating 50 is applied by electroplating or HVOF, the porosity of the coating 50 is typically less than 5%. When the step of applying the coating 50 includes plasma spraying, the porosity of the coating 50 typically ranges from 5 to 10%.

In order to applying the coating 50 to the hot spots along the undercrown surface 44, the method can include masking the cooler areas of the portions of the undercrown surface 44 while applying the coating 50, so that the coating 50 is not applied to the cooler areas. In cases where the piston body 22 includes the top and bottom, the method typically includes welding the top and the bottom together after applying the coating 50. The method can also include heat treating the piston body 22 after applying the coating 50.

According example embodiments, the thickness of the coating 50 is in the range 10 microns to 1 mm. Electrodeposition produces the coating 50 at the thin end of the range from an electrolyte solution while thermal spraying includes depositing a thicker coating 50 from powder feedstock. Electrodeposition and HVOF coatings are denser (porosity <5%) than plasma deposits (porosity 5-10%). The copper or other high thermal conductivity coating 50 can be applied on the masked piston body 22, if desired, after final machining. In the case of the pistons 20 including the cooling gallery 64, the coating 50 can be deposited prior to welding pre-machined forgings. Subsequent heat treatment and machining operations are not expected to have a detrimental effect on the coating 50. Applying manganese phosphate to the coating 50 is also a possibility.

In one the embodiment wherein the piston body 22 includes the sealed outer cooling gallery 64 forming a portion of the undercrown surface 44, the coating 50 is disposed on the portion of the undercrown surface 44 formed by the sealed outer cooling gallery 64, and the coolant composition 52, for example the composition 52 including the copper particles, silicone oil, and argon, is disposed in the sealed outer cooling gallery 64. In this case, the coating 50 is formed from the solid particles, for example the copper particles, in the composition 52. The step of applying the coating 50 includes forming the coating 50 from the solid particles in the composition 52 during operation of the piston 20 in the engine. The solid particles forming the coating 50 have a particle size of 10 to 100 microns, and the solid particles remaining in the composition after the coating 50 is formed have a particle size different from the solid particles forming the coating 50.

In the embodiment wherein the coating 50 is formed from the solid particles in the composition 52 of the sealed outer cooling gallery 64, the coating 50 is deposited by forces acting on the mixed composition 52 inside the gallery 64. It is similar to a "cold spray" deposition process in which the kinetic energy of the particle is sufficient to deform it into a splat that firmly attaches to the rigid surface that it encounters. The particle in this case is copper or another material having a thermal conductivity ranging from 45 to 429 W/m·K, and the rigid surface is the undercrown surface 44 forming the gallery 64. Only certain particle sizes have the right properties to be deposited. Since the solid particles have a particle size distribution, a narrow range of size is depleted from the composition 52 and deposited to form the coating 50. The rest of the solid particles remain in suspension to perform the intended heat transfer from the crown to underside. With the hot spots mitigated, degradation of the silicone oil is reduced such that the composition 52 including the silicone oil can survive or exceed the expected lifetime of the engine. It is the high thermal conductivity of copper (401 W/m·K) or other solid particles that enables the coating 50 to dissipate heat laterally and to even out the hot spots, even when only a thin layer of less than 100 microns is present.

Once the particles of with the right size range are depleted from the composition 52, the remainder of the particles stay in suspension. In this embodiment, all of the components inside the gallery 64 are useful and reach a final intended state after a period of time in the engine, and the coating 50 is intended to improve with accumulated engine hours and up to the self-limiting deposition point, the system improves with time.

Many modifications and variations of the present invention are possible in light of the above teachings and may be practiced otherwise than as specifically described while remaining within the scope of the claims. It is contemplated that all features of all claims and of all embodiments can be combined with each other, so long as such combinations would not contradict one another.

What is claimed is:

1. A method of manufacturing a piston for an internal combustion engine, comprising the steps of:
    providing a piston body extending along a central longitudinal axis;
    the piston body having an upper combustion wall forming an upper combustion surface and an undercrown surface beneath the upper combustion surface, a ring belt region depending from the upper combustion surface, a pair of skirt panels depending from the ring belt region, and a pair of pin bosses depending from the undercrown surface, the pin bosses providing a pair of laterally spaced pin bores;
    the piston body including one of an open outer cooling gallery forming a portion of the undercrown surface, a sealed outer cooling gallery forming a portion of the undercrown surface, or an outer galleryless region forming a portion of the undercrown surface, and the piston body include a central undercrown region forming a portion of the undercrown surface;
    applying a coating having a thermal conductivity of 45 to 429 W/m·K to at least one hotter area of at least one of the portions of the undercrown surface and not applying the coating to at least one cooler area of at least one of the portions of the undercrown surface, wherein the at least one hotter area is at a higher temperature than the at least one cooler area during operation of the piston when the coating is not applied; and
    masking the at least one cooler area of at least one of the portions of the undercrown surface while applying the coating.

2. The method of claim 1, wherein the step of applying the coating includes electroplating or thermal spraying.

3. The method of claim 1, wherein the step of applying the coating includes electroplating or HVOF, and the porosity of the coating is less than 5%.

4. The method of claim 1, wherein the step of applying the coating includes plasma spraying, and the porosity of the coating ranges from 5-10%.

5. The method of claim 1 including heat treating the piston body after applying the coating.

6. A method of manufacturing a piston for an internal combustion engine, comprising the steps of:
    providing a piston body extending along a central longitudinal axis;
    the piston body having an upper combustion wall forming an upper combustion surface and an undercrown surface beneath the upper combustion surface, a ring belt region depending from the upper combustion surface, a pair of skirt panels depending from the ring belt region, and a pair of pin bosses depending from the undercrown surface, the pin bosses providing a pair of laterally spaced pin bores;
    the piston body including a sealed outer cooling gallery forming a portion of the undercrown surface;
    disposing a composition in the sealed outer cooling gallery, the composition including solid particles, silicone oil, and argon;
    applying a coating having a thermal conductivity of 45 to 429 W/m·K to the undercrown surface formed by the sealed outer cooling gallery; and
    the step of applying the coating including forming the coating from the solid particles in the composition during operation of the piston.

7. The method of claim 6, wherein the solid particles include copper.

8. The method of claim 6, wherein the solid particles forming the coating have a particle size of 10 to 100 microns, and the solid particles remaining in the composition have a particle size different from the solid particles forming the coating.

\* \* \* \* \*